United States Patent
Tang et al.

(10) Patent No.: US 9,296,927 B2
(45) Date of Patent: Mar. 29, 2016

(54) EXTRUDABLE PRESSURE SENSITIVE NON-BLACK ADHESIVE COMPOSITIONS AND METHODS FOR PREPARING THE SAME

(75) Inventors: Jiansheng Tang, Westfield, IN (US); Brandon Ward, Brownsburg, IN (US)

(73) Assignee: Firestone Building Products Co., LLC, Indianapolis, IN (US)

( * ) Notice: Subject to any disclaimer, the term of this patent is extended or adjusted under 35 U.S.C. 154(b) by 366 days.

(21) Appl. No.: 13/885,072

(22) PCT Filed: Nov. 12, 2011

(86) PCT No.: PCT/US2011/060495
§ 371 (c)(1),
(2), (4) Date: Aug. 1, 2013

(87) PCT Pub. No.: WO2012/065145
PCT Pub. Date: May 18, 2012

(65) Prior Publication Data
US 2013/0302550 A1  Nov. 14, 2013

Related U.S. Application Data (60) Provisional application No. 61/412,918, filed on Nov. 12, 2010.

(51) Int. Cl.
| | |
|---|---|
| *C08K 3/18* | (2006.01) |
| *C09J 119/00* | (2006.01) |
| *C08J 3/24* | (2006.01) |
| *C09J 123/10* | (2006.01) |
| *C09J 123/22* | (2006.01) |
| *C09J 123/28* | (2006.01) |
| *C08G 18/54* | (2006.01) |
| *C09J 175/04* | (2006.01) |
| *C09J 7/02* | (2006.01) |
| *C09J 115/02* | (2006.01) |
| *C08L 75/04* | (2006.01) |

(52) U.S. Cl.
CPC .............. *C09J 119/00* (2013.01); *C08G 18/54* (2013.01); *C08J 3/246* (2013.01); *C09J 7/0214* (2013.01); *C09J 115/02* (2013.01); *C09J 123/10* (2013.01); *C09J 123/22* (2013.01); *C09J 123/283* (2013.01); *C09J 175/04* (2013.01); *C08J 2309/00* (2013.01); *C08J 2375/04* (2013.01); *C08L 75/04* (2013.01); *Y10T 428/1438* (2015.01)

(58) Field of Classification Search
CPC ....... C09J 119/00; C09J 115/02; C09J 7/0214
USPC .................................. 428/40.9; 524/507, 574
See application file for complete search history.

(56) References Cited

U.S. PATENT DOCUMENTS

| | | | |
|---|---|---|---|
| 4,555,552 A | 11/1985 | Coran et al. | |
| 4,803,257 A * | 2/1989 | Goel ............................... | 528/45 |
| 4,855,172 A | 8/1989 | Chiu | |
| 5,143,772 A * | 9/1992 | Iwasa ............................. | 428/122 |
| 5,221,785 A | 6/1993 | Ando et al. | |
| 5,232,531 A | 8/1993 | Dammann et al. | |
| 5,242,727 A | 9/1993 | Briddell et al. | |
| 5,374,666 A | 12/1994 | Tamono et al. | |
| 5,504,136 A | 4/1996 | Davis et al. | |
| 5,807,632 A * | 9/1998 | Pedginski et al. ............. | 428/352 |
| 5,872,203 A * | 2/1999 | Wen et al. ....................... | 528/66 |
| 5,985,981 A | 11/1999 | Alexander | |
| 9,068,038 B2 * | 6/2015 | Fieldhouse et al. | |
| 2007/0000926 A1 | 1/2007 | Jacob et al. | |
| 2013/0165583 A1 | 6/2013 | Fieldhouse et al. | |

FOREIGN PATENT DOCUMENTS

| | | |
|---|---|---|
| EP | 0924278 A1 | 6/1999 |
| EP | 1739127 A1 | 1/2007 |
| GB | 2261221 A | 5/1993 |
| WO | WO9303914 A1 | 3/1993 |
| WO | WO2008/000493 A1 | 1/2008 |
| WO | WO2011/137217 A1 | 11/2011 |

OTHER PUBLICATIONS

International Preliminary Report on Patentability for International Appl. No. PCT/US2011/060495; dated May 14, 2013; 6 pages.
International Search Report for International Appl. No. PCT/US2011/060495; dated Feb. 8, 2012; 9 pages.
International Preliminary Report on Patentability for International Appl. No. PCT/US2011/034270; dated Oct. 30, 2012; 6 pages.
International Search Report for International Appl. No. PCT/US2011/034270; dated Jul. 20, 2011; 3 pages.

* cited by examiner

*Primary Examiner* — Hannah Pak
(74) *Attorney, Agent, or Firm* — Jason A. Houser; Arthur M. Reginelli (57) ABSTRACT

A pressure-sensitive adhesive polymeric composition comprising: (a) a butyl rubber; (b) a polyurethane; (c) an olefinic polymer component; and (d) a filler that includes titanium dioxide.

14 Claims, 2 Drawing Sheets

EXTRUDABLE PRESSURE SENSITIVE NON-BLACK ADHESIVE COMPOSITIONS AND METHODS FOR PREPARING THE SAME

This application is a national-stage application of International Application Serial No. PCT/US11/60495, filed Nov. 12, 2011, which claims the benefit of U.S. Provisional Application Ser. No. 61/412,918, filed Nov. 12, 2010, both of which are incorporated herein by reference.

FIELD OF THE INVENTION

Embodiments of the present invention are directed toward non-black extrudable pressure sensitive adhesive compositions and methods for making the same; the compositions are particularly useful as a seaming tape for polymeric roofing membranes.

BACKGROUND OF THE INVENTION

Flat or low-sloped roofs are often covered with polymeric membranes that protect the roof from environmental impact such as snow and rain. These polymeric membranes are typically manufactured and shipped in widths that are narrower than the roof surface to which they are installed. Accordingly, multiple membranes are often installed, and adjacent membranes are seamed together.

Pressure sensitive seam tapes are often employed for this purpose. Specifically, a pressure sensitive seam tape is applied to one surface of a membrane along a longitudinal edge, and an adjacent membrane is mated along its longitudinal edge to the top surface of the pressure sensitive seam tape to thereby form a seam.

Polymeric roofing membranes have historically been black in color. This color derives from the use of carbon black filler, which has been used to provide the membrane with advantageous mechanical properties. In warmer climates, however, it is believed that the black color absorbs solar energy and thereby places larger energy demands on those systems attempting to cool the building structures. In face of these concerns, the industry has provided white polymeric roofing membranes. While black tape can be used in conjunction with these white membranes, there is a desire to employ white tape in conjunction with white membranes.

Although some white tapes have been employed in the industry, they suffer several drawbacks. First, they lack the strength and mechanical properties associated with black adhesive tape. Second, they require significant cure time, which reduces manufacturing efficiencies and increases costs. Also, due to the level of curing, the compositions behave as thermoset materials and are therefore not reprocessable.

There is therefore a desire for pressure-sensitive white adhesive tape compositions that are more efficiently manufactured, are reprocessable, and demonstrate the mechanical and performance characteristics that have come to be expected from conventional tapes.

SUMMARY OF THE INVENTION

One or more embodiments of the present invention provide a pressure-sensitive adhesive polymeric composition comprising: (a) a butyl rubber; (b) a polyurethane; (c) an olefinic polymer component; and (d) a filler that includes titanium dioxide.

Still other embodiments of the present invention provide a method for producing a pressure-sensitive adhesive polymeric composition, the method comprising: (a) providing a halogenated butyl rubber including one or more halogen atoms and one or more double bonds deriving from isoprene; (b) providing a propylene-based copolymer; (c) providing a filler that includes titanium dioxide; (d) partially cross-linking the butyl rubber by displacement of two or more of the halogen atoms by a metal oxide; (e) chemically binding an unfunctionalized phenolic resin across one or more of the double bonds to provide the butyl rubber with a hydroxyl functionality; (f) chemically binding an isocyanate to at least one hydroxyl functionality of the butyl rubber to form a propylene-based elastomer/butyl rubber/urethane macromolecule; and (g) forming a polyurethane in the presence of the propylene-based elastomer/butyl rubber/urethane macromolecule.

Still other embodiments of the present invention provide a method for producing a pressure-sensitive adhesive polymeric composition, the method comprising: (a) charging a halogenated butyl rubber, a propylene-based elastomer, and an unfunctionalized phenolic resin to a reaction extruder; (b) charging a metal oxide to promote the crosslinking of said butyl rubber; (c) charging a catalyst and isocyanate to promote a reaction between the butyl rubber and the unfunctionalized phenolic resin; (d) charging a filler that includes titanium dioxide; and (e) mixing said propylene-based elastomer, said filler, said partially crosslinked rubber, said unfunctionalized phenolic resin, said catalyst and said isocyanate to thereby form a polyurethane, wherein said polyurethane and said propylene-based elastomer are dispersed within butyl rubber.

DETAILED DESCRIPTION OF ILLUSTRATIVE EMBODIMENTS

Embodiments of the present invention include non-black pressure-sensitive adhesive compositions that include a phenolic-based polyurethane and an olefinic component dispersed within a butyl rubber matrix. In one or more embodiments, the polyurethane may be formed by reacting an isocyanate with an unfunctionalized phenolic resin. In one or more embodiments, the composition may be produced by forming the polyurethane in the presence of the butyl rubber and optionally in the presence of the olefinic component. The polyurethane is formed in the presence of the butyl rubber by reacting an isocyanate with an unfunctionalized phenolic resin in the presence of a catalyst for the polyurethane. Processing oil may be added to the composition, along with other conventional additives, at various stages of the process. In particular embodiments, the compositions can be manufactured continuously within a reactive extruder.

In preparing the compositions of the present invention, one or more of the following ingredients may be employed. These ingredients include butyl rubber, thermoplastic polymer, unfunctionalized phenolic resin, tackifier resin, isocyanate, metal oxide, polyurethane catalyst, oil, filler, and stabilizers and antioxidants.

In one or more embodiments, butyl rubber includes copolymers and terpolymers of isobutylene and at least one other comonomer. Useful comonomers include isoprene, divinyl aromatic monomers, alkyl substituted vinyl aromatic monomers, and mixtures thereof. Exemplary divinyl aromatic monomers include vinyl styrene. Exemplary alkyl substituted vinyl aromatic monomers include α-methyl styrene and paramethyl styrene. These copolymers and terpolymers may also be halogenated (i.e., halogenated butyl rubber) such as in the case of chlorinated and brominated butyl rubber, which may be referred to as bromobutyl rubber. In one or more embodiments, these halogenated polymers may derive from monomer such as parabromomethylstyrene.

In one embodiment, where the butyl rubber includes an isobutylene-isoprene copolymer, the copolymer may include from about 0.5 to about 30, or in other embodiments from about 0.8 to about 5, percent by weight isoprene based on the entire weight of the copolymer with the remainder being isobutylene.

In the case of halogenated butyl rubbers, the butyl rubber may include from about 0.1 to about 10, or in other embodiments from about 0.3 to about 7, or in other embodiments from about 0.5 to about 3, percent by weight halogen based upon the entire weight of the copolymer or terpolymer.

In one or more embodiments, the glass transition temperature (Tg) of useful butyl rubber can be less than about −55° C., or in other embodiments less than about −58° C., or in other embodiments less than about −60° C., or in other embodiments less than about −63° C.

In one or more embodiments, the Mooney viscosity ($ML_{1+8}$@125° C.) of useful butyl rubber can be from about 15 to about 75, or in other embodiments from about 20 to about 75, in other embodiments from about 25 to about 75, in other embodiments from about 30 to about 60, or in other embodiments from about 40 to about 55; as those skilled in the art appreciate, the Mooney viscosity can be determined using methods described in ASTM D 1646. In one or more embodiments, the Mooney viscosity ($ML_{1+8}$@125° C.) is less than 50, in other embodiments less than 40, in other embodiments less than 35, and in other embodiments less than 30.

Useful butyl rubber includes those prepared by polymerization at low temperature in the presence of a Friedel-Crafts catalyst as disclosed within U.S. Pat. Nos. 2,356,128 and 2,944,576, which are incorporated herein by reference. Other methods may also be employed.

Butyl rubber can be obtained from a number of commercial sources as disclosed in the Rubber World Blue Book. For example, halogenated copolymers of isobutylene and isoprene are available under the tradename Exxon Butyl™ (ExxonMobil Chemical Co.), halogenated and un-halogenated copolymers of isobutylene and paramethyl styrene are available under the tradename EXXPRO™ or Exxon Bromobutyl 2222 (ExxonMobil Chemical Co.), star branched butyl rubbers are available under the tradename STAR BRANCHED BUTYL™ (ExxonMobil Chemical Co.), and brominated isobutylene-isoprene copolymer with high Mooney viscosity is available under the tradename Lanxess Bromobutyl X2 or Bromobutyl 2030 (Lanxess, Inc.).

In one or more embodiments, the olefinic component includes one or more olefinic polymers and/or copolymers. In particular embodiments, the polymers or copolymers include mer units deriving from the polymerization of propylene monomer; accordingly, these polymers or copolymers may be referred to as propylene-based polymers or copolymers or simply propylene polymers or copolymers.

In particular embodiments, at least one of the olefinic polymers is a propylene-based copolymer, which includes mer units deriving from the polymerization of propylene, together with comonomer selected from ethylene and/or $C_4$-$C_{20}$ α-olefins. In certain embodiments, the propylene-based copolymers include mer units deriving from the polymerization of propylene and ethylene; which copolymers may be referred to as propylene-ethylene copolymers. Blends of propylene polymers, such as polypropylene homopolymer and propylene-based copolymers may be employed.

In one or more embodiments, the olefinic component includes a reactor copolymer, which may also be referred to as in-reactor copolymer. Reactor copolymers are generally known in the art and may include blends of olefinic polymers that result from the polymerization of ethylene and α-olefins (e.g., propylene) with sundry catalyst systems. In one or more embodiments, these blends are made by in-reactor sequential polymerization. Reactor copolymers useful in one or more embodiments include those disclosed in U.S. Pat. No. 6,451,897, which is incorporated therein by reference. Reactor copolymers, which are also referred to as TPO resins, are commercially available under the tradename HIFAX™ (Lyondellbassel), such as CA10A, which is believed to include in-reactor blends of ethylene-propylene rubber and polypropylene or polypropylene copolymers. Other useful reactor copolymers include ADFLEX™, SK-359P (Lyondellbassel), and Softell™ (Lynodellbassel). In one or more embodiments, the in-reactor copolymers may be physically blended with other polyolefins. For example, in-reactor copolymers may be blended with polypropylene or linear low density polyethene.

In one or more embodiments, the olefinic component includes a propylene-α-olefin copolymer (e.g., propylene-ethylene) that has a combination of two, three, or more (e.g., a combination of all) of the following characteristics: (a) a molecular weight distribution (MWD) of about 1.5 to about 4 (e.g., 2 to 3 or less than 2.5 or 2.0); (b) a melt flow rate (at 230° C.) (MFR) (per ASTM D1238) of at least about 0.3 (e.g., at least about 0.5 g/10 min or at least about 1.0 g/10 min) or in the range from about 0.3 to about 50 g/10 min (e.g., 2 to 25 g/10 min or 3 to a 15 g/10 min); (c) a density (per ASTM D792) of about 0.80 to about 0.95 g/cc and more particularly about 0.85 to 0.91 (e.g. 0.858 to 0.888 g/cc or); (d) a comonomer content of about 3 to 25 wt % (e.g., a $C_2$ or ethylene content of 5 to 20 wt % or 8 to 15 wt %); (e) a glass transition temperature (Tg) of about 0 to about −50° C. (e.g., −15 to −35° C.); (f) a melting range from about 40 to about 160° C. (e.g., 50 to 135° C. or less than 115° C. or less than 105° C.); (g) a shore A hardness from about 25 to about 100, and more particularly about 40 to about 90 (e.g., 50 to 75); (h) a heat of fusion (DSC) (ASTM D3417-97) of about 2 to 75% of homoisotactic polypropylene and more particularly 5 to 65% (e.g. less than 60% or less than 55%) of homoisotactic polypropylene; and (i) a flexural modulus (per ISO 178) of about 5 to 1000 MPa, or more particularly from 8 to 325 MPa (e.g., 10 to 280 MPa), or higher (e.g., in excess of 2000 MPa or). By way of example, without limitation, such material may have a flexural modulus of about 8 to about 325 MPa (e.g., about 10 to 280 MPa), an ethylene content of about 3 to 25 wt %, and optionally a peak melting peak below about 135° C., a shore A hardness from about 25 to about 100, and more particularly about 40 to about 90 (e.g., 50 to 75); or a combination of both. A commercially available example of one such copolymer is available under the tradename VERSIFY™ (The Dow Chemical Company). These propylene-ethylene copolymers are believed to be described in U.S. Publication Nos. 2008/0261471 and 2010/0143651, which are incorporated herein by reference. Other suitable polypropylene-based polymers include VISTAMAXX™ polymers;

e.g., 6102, 6202, and 3000 (ExxonMobil Chemical Co.). These propylene-ethylene copolymers are believed to be described in WO 2008/000493, which is incorporated herein by reference. According to WO 2008/000493, these polymers are characterized by a MWD of 1.5 to 5.0 (preferably 1.5 to 3.2), a heat of fusion, measured by DSC per ASTM D3417-97, of from 2 to 65% (preferably 5 to 40%) of homoisotactic polypropylene, and comprise 80 to 94 wt. % (preferably 84 to 90 wt. %) propylene monomer units and 6 to 20 wt. % (preferably ethylene at 10 to 16 wt. %) α-olefin monomer units; the polymers are preferably using a metallocene catalyst per EP-A-969043. Still other commercial products that are believed to be useful include LICOCENE™ polymers (Clariant), EASTOFLEX™ polymers (Eastman Chemical Co.), REX-TAC™ polymers (Hunstman), and VESTOPLAST™ polymers (Degussa).

The phenolic resin is devoid or substantially devoid of terminal functional groups, and therefore it may be referred to as the unfunctionalized phenolic resin.

In one or more embodiments, the unfunctionalized phenolic resin may include those defined by the formula where each $R^3$ is independently a divalent organic group, each $R^2$ is independently a monovalent organic group, and m is an integer from 0 to 20.

In one or more embodiments, each $R^3$ is devoid of heteroatoms. In these or other embodiments, each $R^2$ is devoid of heteroatoms. In these or other embodiments, each $R^2$ is a sterically hindered or highly branched alkyl group. In one or more embodiments, each phenol substituent within the resin may include further substitution (i.e, one or more hydrogen atoms attached to the phenol ring may be replaced with an alkyl group); the substituents that form the substituted phenol are devoid of heteroatoms.

In one or more embodiments, the unfuctionalized phenolic resin is a resole resin, which can be made by the condensation of alkyl, substituted phenols, or unsubstituted phenols with aldehydes such as formaldehyde in an alkaline medium or by condensation of bi-functional phenoldialcohols. In one or more embodiments, this condensation reaction occurs in the excess or molar equivalent of formaldehyde. In other embodiments, the unfunctionalized phenolic resin may be formed by an acid-catalyzed reaction.

Unfunctionalized phenolic resins may be obtained under the tradename SP-1068 (Schenectady International; Schenectady, N.Y.). SP-1068 is believed to be an octylphenol-formaldehyde resin that is devoid or substantially devoid of terminal functional groups such as halogen atoms or methylol groups.

In one or more embodiments, useful isocyanates include aromatic polyisocyanates such as diphenyl methane diisocyanate in the form of its 2,4'-, 2,2'-, and 4,4'-isomers and mixtures thereof, the mixtures of diphenyl methane diisocyanates (MDI) and oligomers thereof known in the art as "crude" or polymeric MDI having an isocyanate functionality of greater than 2, toluene diisocyanate in the form of its 2,4' and 2,6'-isomers and mixtures thereof, 1,5-naphthalene diisocyanate, and 1,4' diisocyanatobenzene. Exemplary isocyanate components include polymeric Rubinate 1850 (Huntsmen Polyurethanes), Rubinate 9433 (Huntsmen Polyurethanes), polymeric Lupranate M70R (BASF), and polymeric Mondur 489N (Bayer). In one or more embodiments, the ingredients used for forming the polyurethane are devoid of diamines and/or amine containing isocyanates.

In one or more embodiments, the tackifier resins may include natural resins, synthetic resins, and low molecular weight polymers or oligomers. The monomer that may be polymerized to synthesize the synthetic resins or low molecular weight polymers or oligomers may include those obtained from refinery streams containing mixtures or various unsaturated materials or from pure monomer feeds. The monomer may include aliphatic monomer, cycloaliphatic monomer, aromatic monomer, or mixtures thereof. Aliphatic monomer can include $C_4$, $C_5$, and $C_6$ paraffins, olefins, and conjugated diolefins. Examples of aliphatic monomer or cycloaliphatic monomer include butadiene, isobutylene, 1,3-pentadiene (piperylene) along with 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, and dicyclopentadiene. Aromatic monomer can include $C_8$, $C_9$, and $C_{10}$ aromatic monomer. Examples of aromatic monomer includes styrene, indene, derivatives of styrene, derivatives of indene, and combinations thereof.

In one or more embodiments, examples of tackifier resins include aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpene-phenol resins, rosin esters, and mixtures of two or more thereof.

In certain embodiments, the synthetic aliphatic or aromatic hydrocarbon resins may be characterized by a number average molecular weight ($M_n$) of from about 400 g/mole to about 3,000 g/mole, and in other embodiments from about 500 g/mole to about 2,000 g/mole. These hydrocarbon resins may also be characterized by a weight average molecular weight ($M_w$) of from about 500 g/mole to about 6,000 g/mole, and in other embodiments from about 700 g/mole to about 5,000 g/mole. Molecular weight may be determined by size exclusion chromatography (SEC) by using a Waters 150 gel permeation chromatograph equipped with the differential refractive index detector and calibrated using polystyrene standards.

In certain embodiments, the hydrocarbon resins include those produced by thermal polymerization of dicyclopentadiene (DCPD) or substituted DCPD, which may further include aliphatic or aromatic monomers. In one embodiment, the DCPD or substituted DCPD is copolymerized with aromatic monomer, and the final product includes less than 10% aromatic content. In another embodiment, the hydrocarbon resin derives from the copolymerization of both aliphatic monomer and aromatic monomer. In particular embodiments, the dicyclopentadiene tackifier resin is hydrogenated. Hydrogenated dicyclopentadiene tackifier resins are commercially available from Neville.

In one or more embodiments, synthetic oligomers may include dimers, trimers, tetramers, pentamers, hexamers, septamers, and octamers of petroleum distillate monomer. In one or more embodiments, this petroleum distillate monomer may have a boiling point of from about 30° to about 210° C.

The oligomers may include byproducts of resin polymerization including thermal and catalytic polymerization. For example, oligomers may derive from processes where DCPD, aliphatic monomer, and/or aromatic monomer are oligomerized.

The hydrocarbon resins may be characterized by an aromatic content of from about 1 to about 60, in other embodiments from about 2 to about 40, and in other embodiments from about 5 to about 10. In one or more embodiments, the tackifier resins are hydrogenated or partially hydrogenated; useful resins include those that are at least 50 percent, in other embodiments at least 80 percent, in other embodiments at least 95 percent, and in other embodiments at least 99 percent or fully hydrogenated. For example, the hydrocarbon resin prior to grafting may contain less than 90, in other embodiments less than 50, in other embodiments less than 25, in other embodiments less than 10, in other embodiments less than 2, in other embodiments less than 1, in other embodiments less than 0.5, and in other embodiments less than 0.05 olefinic protons. Aromatic content and olefin content may be measured by $^1$H-NMR as measured directly from the $^1$H NMR spectrum from a spectrometer with a field strength greater than 300 MHz, and in other embodiments 400 MHz (frequency equivalent). Aromatic content includes the integration of aromatic protons versus the total number of protons. Olefin proton or olefinic proton content includes the integration of olefinic protons versus the total number of protons.

In one or more embodiments, the tackifier resin may be characterized by a softening point of from about 15° C. to about 210° C., in other embodiments from about 65° C. to about 170° C., and in other embodiments from about 90° C. to about 140° C. Softening point can be determined according to ASTM E-28 (Revision 1996). In particular embodiments, especially where a propylene copolymer is employed, at least one tackifier resin is employed that is characterized by a softening point of less than 120° C., in other embodiments less than 110° C., and in other embodiments less than 107° C.; this tackifier resin, which may be referred to as a low-softening point tackifier resin, may have a softening point from 90° C. to 120° C., in other embodiments from 95° C. to 110° C., and in other embodiments from 100° C. to 107° C. In certain embodiments, the low-softening point tackifier resin may be used in conjunction with a second tackifier resin having a higher softening point. The second tackifier resin, which may be referred to as a high-softening point tackifier resin, may be characterized by having a softening point in excess of 120° C., in other embodiments in excess of 125° C., and in other embodiments in excess of 130° C.; this high-softening point tackifier resin may have a softening point of from 120° C. to 150 C., in other embodiments from 125° C. to 145° C., and in other embodiments from 130° C. to 137° C.

In these or other embodiments, the tackifier resin may be characterized by a glass transition temperature of less than 120° C., in other embodiments less than 110° C., and in other embodiment from about 60° C. to about 80° C. Glass transition temperature may be determined according to ASTM D 341-88 by using differential scanning calorimetry.

In these or other embodiments, the tackifier resin may be characterized by a Saponification number (mg KOH/g resin material) of greater than 10, in other embodiments greater than 15, and in other embodiments greater than 19.

In these or other embodiments, the tackifier resin may be characterized by an acid number greater than 10, in other embodiments greater than 15, and in other embodiments greater than 20, and in other embodiments greater than 25.

In one or more embodiments, a metal oxide may be employed. It is believed that the metal oxide may serve or play one or more roles in the formation of the composition. For example, it is believed that the metal oxide may catalyze some crosslinking of the butyl rubber, catalyze crosslinking of the butyl rubber with the phenolic resin, and/or promote polyurethane formation. The metal oxides may include alkali metal oxides, alkali earth metal oxides, and transition metal oxides. In particular embodiments, the metal oxide is magnesium oxide, and in other embodiments the metal oxide is calcium oxide. It is believed that calcium oxide may advantageously serve as a desiccant. In other embodiments, the metal catalyst may be an organometal such as magnesium resinate.

In one or more embodiments, the catalyst for polyurethane, which may also be referred to as polyurethane catalyst, which is believed to promote a reaction between the unfunctionalized phenolic resin and the isocyanate, is an amine compound. It is also believed that an amine can serve to promote a reaction between halogenated butyl rubber and unfunctionalized phenolic resin. Useful amine compounds include those that promote a reaction between a polyol and an isocyanate (which is known as a gel reaction), those that promote a reaction between water and icocyanate (which is known as a blow reaction), and those catalysts that promote isocyanate trimerization. Exemplary amine catalysts include triethylenediamine (TEDA), dimethylcyclohexylamine (DMCHA), dimethylethanolamine (DMEA), tetramethylbutanediamine (TMBDA), pentamethyldipropylenetriamine, N-(3-dimethylaminopropyl)-N,N-diisopropanolamine, 1,3,5-(tris(3-dimethylamino) propyl)-hexahydro-s-triazine, bis-(2-dimethylaminoethyl)ether, N-ethylmorpholine, triethylamine (TEA), 1,8-diazabicyclo[5.4.0]undecene-7 (DBU), pentamethyldiethylenetriamine (PMDETA), benzyldimethylamine (BDMA), pentamethyldiethylene triamine (PMDETA), 2,4,6-tris[(dimethylamino)methyl]phenol, tributyl amine, N-methyl morpholine, and N-ethyl morpholine. Examples of amine catalysts include those available from Dabco as 33LV, which is 33 percent dissolved in carrier oil.

In one or more embodiments, the compositions of the present invention may include oil, which may also be referred to as processing oil or extender oil. These extenders may include high-boiling hydrocarbons. Examples of these oils include paraffinic oils, aromatic oils, naphthenic oils, vegetable oils, and low PCA oils including MES, TDAE, and SRAE, and heavy naphthenic oils, and various synthetic oils such as, but not limited, polybutene oils. In one or more embodiments, the oil employed is selected based upon its compatibility with the rubber, as well as its ability to provide advantageous properties to the final composition (e.g., green strength or tack).

In particular embodiments, a polybutene oil is employed. Useful polybutene oils include high-viscosity oils that may be characterized by a viscosity at 100° C. of at least 80 cst, in other embodiments at least 100 cst, or in other embodiments at least 120 cst up to, for example, about 700 or 800 cst. In these or other embodiments, the high viscosity polybutene oils may be characterized by a molecular weight of at least 1000 g/mole, in other embodiments at least 1200 g/mole, or in other embodiments at least 1300 g/mole up to, for example, 1400 or 1500 g/mole. An exemplary high-viscosity polybutene oil is available under the tradename Indapol H300 (Ineos) or PB32 (Soltex).

In these or other embodiments, oils or extenders may be used as carriers for one or more of the various ingredients employed in preparing the compositions. When used as a carrier, the oils may, especially where it may be disadvantageous to heat the oil (e.g., when used as a carrier for a catalyst), include low viscosity or low molecular weight oils. In other words, where a low molecular weight or low viscosity oil is employed, the oil, along with the constituent that it carries, can be injected into the composition without heating. Exemplary low-viscosity oils may be characterized by a viscosity at 100° C. of less than 80 cst, in other embodiments less than 70 cst, or in other embodiments less than 60 cst. In these or other embodiments, these low-viscosity oils may be characterized by a molecular weight of less than 100 g/mole, or in other embodiments less than 700 g/mole. An exemplary low-viscosity oil is a polybutene oil available under the tradename Indapol H25 (Ineos).

Other oils that may be employed include carriers for the isocyanate component. That is, because the solubility of the isocyanate may be distinct from other components of the composition, particular oils or carriers may need to be selected. In particular embodiments, aromatic oils are used as carriers for the isocyanate component. An exemplary aromatic oil includes that available under the tradename HB40 (Solutia). Other useful oils include Ruetasolv DI (Rutgers), which is a diisopropyl naphthalene, which is advantageously both a low-viscosity oil and an oil that is compatible with the isocyanate.

In one or more embodiments, the compositions of the present invention may include fillers or pigments to impart whiteness to the compositions. In one or more embodiments, fillers include clay, talc, mica, titanium dioxide, calcium carbonate, silica, or combinations of two or more thereof.

In one or more embodiments, titanium dioxide is used for improving whiteness, brightness, and opacity within the polymeric composition. In one or more embodiments, the titanium dioxide has a refractive index of from about 2.55 to about 2.7, a specific gravity of from about 3.7 to about 4.2, and a pH of from about 6.5 to about 8.5. Useful $TiO_2$ is available under the tradenames Ti-Pure® R-960 and R-105, which is a fine, white powder having a specific gravity of 3.9, and TIOXIDE®(DuPont). Another suitable titanium dioxide product is CR-822 (TRONOX), which is believed to be characterized by a titanium dioxide content of about 96% and specific gravity of about 3.8 to about 4.1.

Useful clays include hydrated aluminum silicates. In one or more embodiments, useful clays can be represented by the formula $Al_2O_3SiO_2.XH_2O$. Exemplary forms of clay include kaolinite, montmorillonite, atapulgite, illite, bentonite, halloysite, and mixtures thereof. In one embodiment, the clay is represented by the formula $Al_2O_3SiO_2.3H_2O$. In another embodiment, the clay is represented by the formula $Al_2O_3SiO_2.2H_2O$. In a preferred embodiment, the clay has a pH of about 7.0.

Useful talcs include hydrated magnesium silicates. In one or more embodiments, talc can be represented by the formulae $Mg_3Si_4O_{10}(OH)_2$ or $3MgO.4SiO_2.H_2O$. Exemplary forms of talc include talcum, soapstone, steatite, cerolite, magnesium talc, steatite-massive, and mixtures thereof. Talc filler may contain various other minerals such as dolomite, chlorite, quartz, and the like. Talc used as filler may also exhibit characteristics such as hydrophobicity, organophilicity, non-polarity, and chemically inertness. In one embodiment, the talc has a specific gravity of from about 2.6 to about 2.8, a pH of from about 7.0 to 8.7, a refractive index of about 1.57 at 23° C., and a moisture content of less than about 0.5 weight percent. A representative talc is Talc 9107, which is available from Polar Minerals (Mt. Vernon, Ind.), which is non-abrasive, chemically inert, has a specific gravity of about 2.8, a pH of about 8.7, a refractive index of about 1.57 at 23° C., and a moisture content of less than about 0.3 weight percent.

Useful forms of silica (silicon dioxide) include crystalline and amorphous silica. The crystalline form of silica includes quartz, tridymite and cristobalite. Amorphous silica may occur when the silicon and oxygen atoms are arranged in an irregular form as identified by X-ray diffraction. In one or more embodiments, the silica is a precipitated silica. In these or other embodiments, fumed silica is employed. Commercially available forms are available from PPG Industries, Inc. (Monroeville, Pa.), Degussa Corporation (Parsippany, N.J.) and J. M. Huber Corporation (Atlanta, Ga.). One useful commercial product is Rubbersil® RS-150, which is characterized by a BET surface area of 150 $m^2/g$, tapped density of 230 g/liter, pH (5% in water suspension) of 7, $SiO_2$ content of 98%, $Na_2SO_4$ content of 2%, and $Al_2O_3$ content of 0.2%. In at least one embodiment, silica filler may be used without any other mineral fillers.

In one or more embodiments, the compositions of the invention include UV stabilizer and/or other additives, such as antioxidants, that will protect the various constituents from the solar radiation and/or heat. In one or more embodiments, the compositions of this invention include a hindered amine light stabilizer. Exemplary light stabilizers are commercially available under the tradename Tinuvin PUR 866, 292, and 770 (Ciba).

In addition to the foregoing constituents, the membranes of this invention may also optionally include homogenizing agents, processing aids such as waxes, flame retardants, zinc oxide, stearic acid, antioxidants, antiozonants, processing additives, fillers and mixtures thereof. Certain embodiments may be substantially devoid of any of these constituents.

In one or more embodiments, the adhesive compositions of this invention may be prepared by forming the polyurethane in the presence of the butyl rubber and optionally the olefinic component. The step of forming the polyurethane, which includes reacting the isocyanate with the phenolic resin in the presence of the butyl rubber, may take place within a reaction extruder such as a twin-screw extruder or a planetary extruder.

Each of the individual ingredients may be added to the extruder either individually or together as one or more pre-blended mixtures or masterbatches. For example, in one embodiment, the butyl rubber and the phenolic resin is formed into a masterbatch by employing a mixer that is separate from the reaction extruder. The masterbatch may then be charged to the extruder, together with additional solids, where the polyurethane is formed. In alternate embodiments, the butyl rubber, phenolic resin, tackifier resin, and olefinic polymer, optionally together with the other solids ingredients, may be charged directly to the feed throat of the extruder using conventional techniques. In particular embodiments, the butyl rubber, the olefinic polymer, the phenolic resin, tackifier resin, and the talc are preblended under ambient conditions and fed to the extruder as a solids mixture.

In certain embodiments, once the initial blend of the butyl rubber, phenolic resin, and the olefinic polymer is prepared, either by masterbatch or within the feed section of the extruder, the remainder of the ingredients for forming the polyurethane may be introduced and the polyurethane is formed. In one or more embodiments, the polyurethane is formed under conditions of mixing including, but not limited to, high shear mixing. In one or more embodiments, the polyurethane is formed by reacting an isocyanate with the phenolic resin. It is believed that the isocyanate reacts with the hydroxyl groups attached directly to the phenyl ring of the phenolic resins; a reaction that is catalyzed by one or more catalysts such as the metal oxide or the amines.

Figure 1:
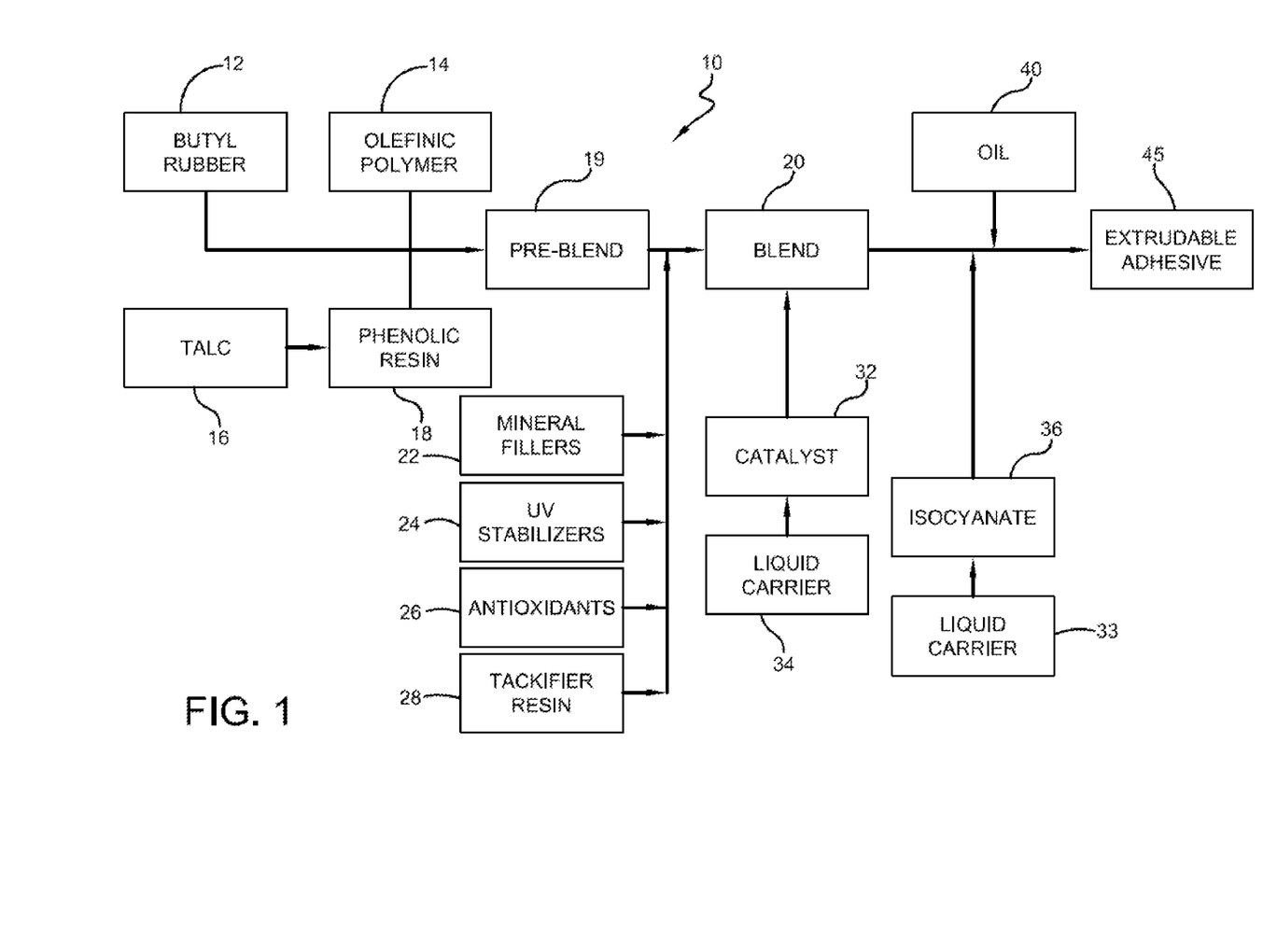
FIG. 1 is a flow chart showing a process for preparing compositions of one or more embodiments of the present invention.

In one or more embodiments, a reaction scheme for preparing the white adhesive composition can be described with reference to FIG. 1. The process 10 includes introducing the solids to form a blend 20. The solids ingredients that may be used to form the blend include butyl rubber 12, olefinic polymer 14, talc 16, and phenolic resin 18 mineral fillers 22 (e.g., titanium dioxide and calcium oxide), UV stabilizers 24, antioxidants 26, tackifier resin 28 and the like. It has been found that the presence of the talc assists in maintaining the blend as a free-flowing mixture. As those skilled in the art appreciate, butyl rubber is typically provided in a bail form, and therefore the process may include the step of grinding the butyl rubber prior to introducing the butyl rubber with the other ingredients. In certain embodiments, two or more of the solids ingredients may be blended to form a preblend 19. For example, one or more of butyl rubber 12, olefinic polymer 14, talc 16, and phenolic resin 18 may be preblended to form preblend 19. In one or more embodiments, the temperature of the composition during formation and mixing of the blend may be from about 80 to about 200° C., or in other embodiments from about 100 to about 150° C.

The blend 20 may be introduced with a catalyst 32 for forming the polyurethane. This catalyst may be introduced in conjunction with a liquid carrier 34 (e.g. dispersed within an oil).

Following introduction of catalyst 32, isocyanate 36 is introduced to the blend. Isocyanate 36 may likewise be introduced with a liquid carrier 38 (e.g. aromatic oil) for the isocyanate.

It is believed that isocyanate 36 reacts with the hydroxyl groups of the unfunctionalized phenolic resin 22 in what is believed to be a polyurethane reaction in the presence of butyl rubber 12 and olefinic component 14, and with the assistance of one or more catalysts, to form extrudable adhesive 45. In one or more embodiments, the temperature of the composition during the formation of the polyurethane may be from about 38° C. to about 120° C., or in other embodiments from about 66° C. to about 110° C.

In these or other embodiments, the temperature of the composition may be reduced prior to exiting the extruder. For example, the temperature may be cooled to about 82° C. to about 104° C., and in other embodiments from about 88° C. to about 99° C.

A variety of rubber and/or plastic processing equipment can be employed in the process according to aspects of the present invention. For example, the compositions can be prepared in continuous-mixing apparatus such as twin-screw or planetary extruders. In a particular embodiment, the composition is prepared within a continuous extruder. The extruder can have dimensions, in terms of length to diameter (L/D), of at least 40/1, in other embodiments at least 45/1, and in other embodiments equal to or at least 50/1. As in generally known in the art, extruders of this nature (which may also be referred to as reaction extruders), may include a plurality of barrels, and within each barrel two or more screws may be positioned. These screws can be equipped with a variety of screw elements, which elements can accomplish a variety of mixing parameters including, without limitation, conveying, high intensity mixing, kneading, and backmixing. Each barrel can be heated or cooled as desired, ingredients can be added at one or more barrels, and gases can be removed at one or more barrels.

Figure 2:
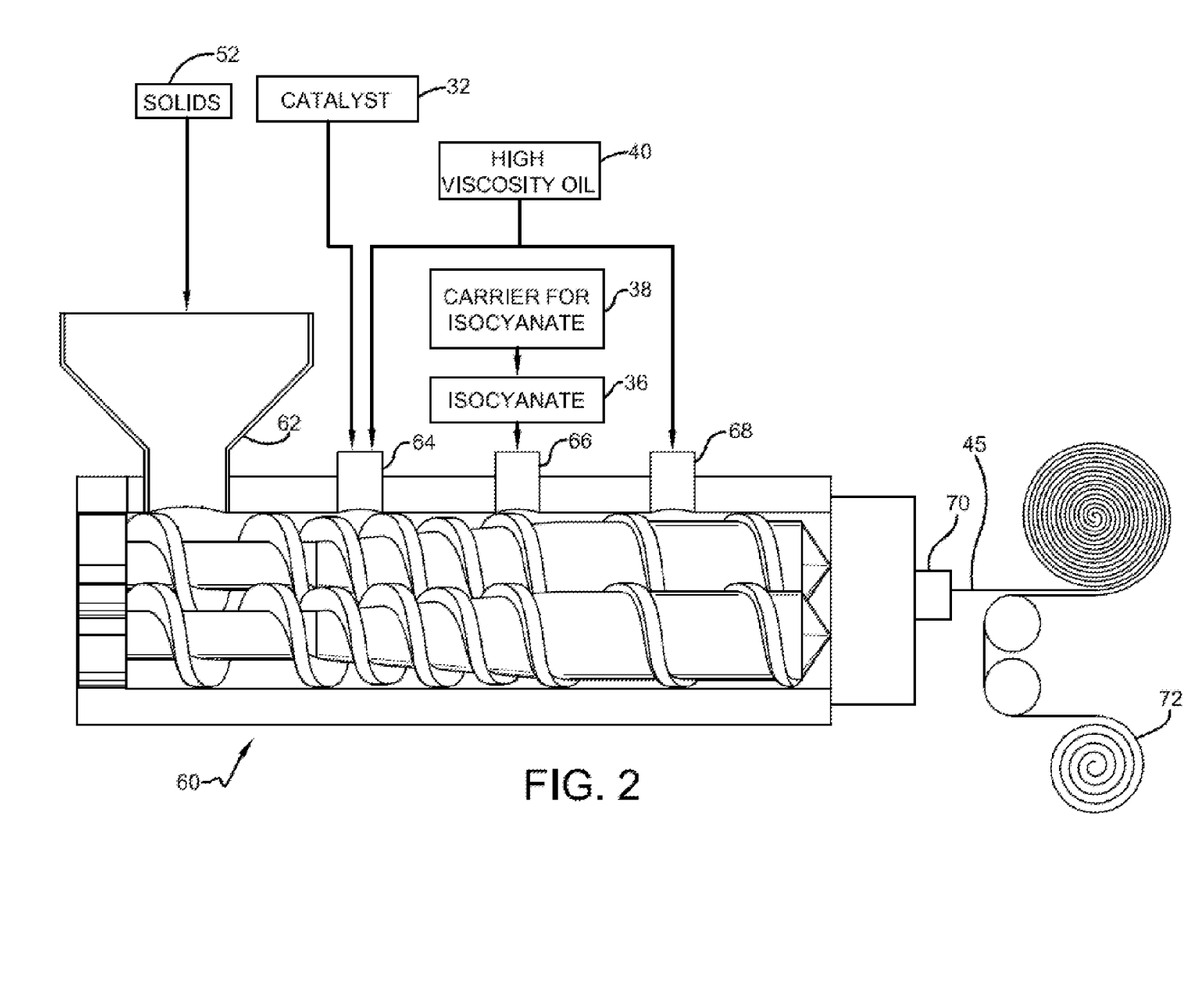
FIG. 2 is a schematic showing a process for making compositions of one or more embodiments of the invention within a continuous extruder.

FIG. 2 shows exemplary extruder 60. In one or more embodiments, the solids ingredients 52 are introduced in the feed throat 62 of extruder 60. Each of the solids ingredients may be individually added to the feed throat using a multitude of feeders (not shown) or certain of the solids ingredients may be preblended prior to introduction to feed throat 62. For example, the butyl rubber 12 and olefinic polymer 14 may be preblended. The solid ingredients (e.g., 52) may be added by way of a pellet feeder and/or by way of a powder feeder. These ingredients may then be mixed at, for example, a temperature of about 93° C. to about 138° C., which may be maintained for about the first 2/5 (i.e. about 24 L/D) of the extruder.

The polyurethane catalyst 32 (e.g. dispersed within a high viscosity carrier oil) is then introduced at a downstream injection point 64, which may be at a barrel located at about 24 L/D, and mixing is continued for about another 12 L/D to disperse the polyurethane catalyst in the solids blend, which may include partially crosslinked rubber. Together with the introduction of polyurethane catalyst 32 or shortly thereafter, the temperature of the composition may be increased (e.g. 93° C. to 121° C.). The isocyante 36 is then introduced (e.g. dispersed within a carrier oil) at a subsequent injection point 66, which may be at a barrel located at about 36 L/D, and mixing is continued for about another 12 L/D to form extrudable adhesive 45.

Following introduction of the isocyanate and initial formation of the polyurethane, the temperature of the composition may be reduced (e.g., 82° C. to 104° C.) in order to facilitate further processing of the composition after leaving the extruder (e.g., placing the composition on a release paper or film). High viscosity oil 18 may be added at various locations in the process. For example, oil may be injected at barrels located about 3/10 L/D and 7/10 L/D (i.e. the $1^{st}$ and $3^{rd}$ injection points 64 and 68) as shown in FIG. 2.

In one or more embodiments, extrudable adhesive 45 may be extruded through a die 70. The die may positioned directly to or adjacent to extruder 60, or additional extruders (not shown) may be employed. The die may be used to form a generally planar extrudate that may be deposited onto a release paper or film 72. In one or more embodiments, the release paper may include a cellulosic non-woven mat (i.e., paper) with a release coating disposed on at least one surface thereof. The release coating may include a polymeric composition such as a silicone or other siloxane-type polymer. In other embodiments, the release paper may include an extruded polymeric film such as a polyethylene film. The resulting laminate, which includes adhesive extrudate deposited onto release paper, may then be wound for subsequent storage, transport, and use. Advantageously, the extrudate can be formed into a variety of sizes. For example, the extrudate may be formed at a thickness of at least about 0.25 mm, in other embodiments at least about 0.5 mm, and in other embodiments at least about 0.70 mm thick. In these or other embodiments, the extrudate may be formed to a thickness of less than about 7 mm, in other embodiments less than about 5 mm, and in other embodiments less than about 2 mm thick. In these or other embodiments, the width of the extrudate, which may have a rectangular cross-section, may be at least 1 cm, in other embodiments at least 2 cm, and in other embodiments at least 2.5 cm wide. In these or other embodiments, the width of the extrudate may be less than 100 cm, in other embodiments less than 75 cm, and in other embodiments less than 60 cm wide.

In one or more embodiments, the compositions of the present invention may be prepared by employing at least 20 percent by weight, in other embodiments at least 25 percent by weight, and in other embodiments at least 30 percent by weight butyl rubber based on the total weight of the composition; i.e., sufficient butyl rubber is employed to form a composition including at least 30 percent by weight butyl rubber. In these or other embodiments, the compositions of the present invention can be prepared by employing less than 65 percent by weight, in other embodiments less than 60 percent by weight, and in other embodiments less than 55 percent by weight butyl rubber based on the total weight of the composition.

In one or more embodiments, the compositions of the present invention may be prepared by employing at least 1 percent by weight, in other embodiments at least 2 percent by weight, in other embodiments at least 3 percent by weight, and in other embodiments at least 5 percent by weight of the olefinic component (e.g., propylene-ethylene copolymer) based on the total weight of the composition. In these or other embodiments, the compositions of the present invention can be prepared by employing less than 50 percent by weight, in other embodiments less than 40 percent by weight, and in other embodiments less than 30 percent by weight of the olefinic component based on the total weight of the composition.

In one or more embodiments, the compositions of the present invention can be prepared by employing at least 0.5 percent by weight, in other embodiments at least 1.0 percent by weight, and in other embodiments at least 1.5 percent by weight unfunctionalized phenolic resin based on the total weight of the composition. In these or other embodiments, the compositions may be prepared by employing less than 30 percent by weight, in other embodiments less than 25 percent by weight, and in other embodiments less than 20 percent by weight unfunctionalized phenolic resin based on the total weight of the composition.

In one or more embodiments, the compositions of the present invention can be prepared by employing at least 1 percent by weight, in other embodiments at least 2 percent by weight, in other embodiments at least 3 percent by weight, in other embodiments at least 5 percent by weight, 10 percent by weight, in other embodiments at least 20 percent by weight, and in other embodiments at least 35 percent by weight tackifier resin based on the total weight of the composition. In these or other embodiments, the compositions may be prepared by employing less than 70 percent by weight, in other embodiments less than 60 percent by weight, in other embodiments less than 55 percent by weight, in other embodiments at least 40 percent by weight, in other embodiments at least 30 percent by weight, and in other elboidments at least 20 percent by weight tackifier resin based on the total weight of the composition. In particular embodiments, a blend of a high-softening point and a low-softening point tackifier resin is employed. In one or more embodiments, the weight ratio of the high-softening point tackifier resin to the low-softening point tackifier resin may be from 0.2:1 to 1.5:1, in other embodiments from 0.5:1 to 1.2:1, and in other embodiments from 0.8:1 to 1.1:1.

In one or more embodiments, the compositions of the present invention can be prepared by employing at least 0.1 percent by weight, in other embodiments at least 0.2 percent by weight, and in other embodiments at least 0.5 percent by weight isocyanate based on the total weight of the composition. In these or other embodiments, the compositions can be prepared by employing less than 10 percent by weight, in other embodiments less than 8 percent by weight, and in other embodiments at less than 6 percent by weight isocyanate based on the total weight of the composition.

In one or more embodiments, the compositions of the present invention can be prepared by employing at least 0.25 in other embodiments at least 0.3, and in other embodiments at least 0.4 percent by weight metal oxide (e.g., calcium oxide) based on the total weight of the composition. In these or other embodiments, the compositions may be prepared by employing less than 5, in other embodiments less than 4, and in other embodiments less than 3 percent by weight metal oxide based on the total weight of the composition.

In one or more embodiments, the compositions of the present invention may be prepared by employing at least 50 ppm, in other embodiments at least 100 ppm, and in other embodiments at least 150 ppm polyurethane catalyst (e.g., amine) based on the total weight of the composition. In these or other embodiments, the compositions of the present invention include less than 5,000 ppm, in other embodiments less than 4,000 ppm, and in other embodiments less than 3,000 ppm polyurethane catlyst based on the total weight of the composition.

In one or more embodiments, the polyurethane catalyst can be introduced as an oil solution or slurry. This blend or slurry may include from about 0.5 to about 40 weight percent, in other embodiments from about 0.8 to about 30 weight percent, and in other embodiments from 1 to 25 weight percent of the polyurethane catalyst, with the balance including an oil.

In one or more embodiments, the compositions of the present invention can be prepared by employing at least 15 in other embodiments at least 20, and in other embodiments at least 25 percent by weight oil based on the total weight of the composition. In these or other embodiments, the compositions of the present invention can be prepared by employing less than 60 in other embodiments less than 55, and in other embodiments less than 35 percent by weight oil based on the total weight of the composition.

In one or more embodiments, the compositions of the present invention can be prepared by employing at least 0.5, in other embodiments at least 1, in other embodiments at least 1.5, in other embodiments at least 2, and in other embodiments at least 3 percent by weight talc based on the total weight of the composition. In these or other embodiments, the compositions of the present invention can be prepared by employing less than 12, in other embodiments less than 10, and in other embodiments less than 8 percent by weight talc based on the total weight of the composition.

In one or more embodiments, the compositions of the present invention can be prepared by employing at least 1, in other embodiments at least 1.5, in other embodiments at least 2, and in other embodiments at least 3 percent by weight titanium dioxide based on the total weight of the composition. In these or other embodiments, the compositions of the present invention can be prepared by employing less than 12, in other embodiments less than 10, and in other embodiments less than 8 percent by weight titanium dioxide based on the total weight of the composition.

Advantageously, the white adhesive composition demonstrates desirable tack and strength without the need for further curing the composition.

In one or more embodiments, the composition of the present invention may be characterized by including at least three phases at standard pressure and temperature. The first phase includes polyurethane domains, the second phase includes thermoplastic (e.g., propylene copolymer) domains, and the third phase includes a butyl rubber matrix, wherein the polyurethane domains and thermoplastic domains are dispersed in the butyl rubber matrix.

In one or more embodiments, the compositions of the present invention are solid adhesives. In one or more embodiments, the solids content of the pressure-sensitive adhesive is at least 90 percent, in other embodiments at least 95 percent, in other embodiments at least 99 percent, and in other embodiments at least 99.9 percent. For purposes of determining the solids content, extender or plasticizer oils are included as solids. Stated another way, the pressure sensitive adhesive compositions of the present invention are devoid or substantially devoid of solvents, which as those skilled in the art appreciate are liquids that dissolve or disperse the solids. In one or more embodiments, the adhesive compositions of the present invention include less than 5 percent, in other embodiments less than 1 percent, and in other embodiments less than 0.5 percent by weight solvent. In certain embodiments, the adhesive composition is substantially devoid of solvent, which refers to the presence of less than an appreciable amount of solvent.

In one or more embodiments, using the color "L", "a", "b" test method and based on the Hunter color scheme (L=0, black; L=100, white), the composition of the present invention has a whiteness of at least an L value of 70, in other embodiments at least an L value of 75, in other embodiments at least an L value 80, in other embodiments at least an L value of 85, in other embodiments at least an L value of 90, or in other embodiments at least an L value of 95.

In one or more embodiments, the composition of the present invention is characterized by a reflectivity, accordingly to ASTM C 1549, of at least 70, in other embodiments at least 75 percent, in other embodiments at least 80 percent, and in other embodiments at least 82 percent.

In one or more embodiments, the composition of the present invention may include at least 20% by weight, in other embodiments at least 25% by weight, and in other embodiments at least 30% by weight butyl rubber, based upon the entire weight of the composition. In these or other embodiments, the composition may include less than 65% by weight, in other embodiments less than 60% by weight, and in other embodiments less than 55% by weight butyl rubber, based upon the entire weight of the composition. In one or more embodiments, the compositions of this invention include from about 20 percent by weight to about 65 percent by weight, in other embodiments from about 25 percent by weight to about 60 percent by weight, and in other embodiments from about 30 percent by weight to about 55 percent by weight butyl rubber (e.g., halogenated butyl rubber), based upon the entire weight of the composition.

In one or more embodiments, the composition of the present invention may include at least 1% by weight, in other embodiments at least 2% by weight, and in other embodiments at least 3% by weight olefinic component (e.g., propylene-ethylene copolymer), based upon the entire weight of the composition. In these or other embodiments, the composition may include less than 50% by weight, in other embodiments less than 40% by weight, and in other embodiments less than 30% by weight olefinic component, based upon the entire weight of the composition. In one or more embodiments, the compositions of this invention include from about 1 percent by weight to about 50 percent by weight, in other embodiments from about 2 percent by weight to about 40 percent by weight, and in other embodiments from about 3 percent by weight to about 30 percent by weight olefinic component (e.g., propylene-ethylene copolymer), based upon the entire weight of the composition.

In one or more embodiments, the composition of the present invention may include at least 1% by weight, in other embodiments at least 1.5% by weight, and in other embodiments at least 2% by weight filler (e.g., titanium dioxide), based upon the entire weight of the composition. In these or other embodiments, the composition may include less than 12% by weight, in other embodiments less than 10% by weight, and in other embodiments less than 8% by weight filler (e.g., titanium dioxide), based upon the entire weight of the composition. In one or more embodiments, the compositions of this invention include from about 1 percent by weight to about 12 percent by weight, in other embodiments from about 1.5 percent by weight to about 10 percent by weight, and in other embodiments from about 2 percent by weight to about 8 percent by weight filler (e.g., titanium dioxide), based upon the entire weight of the composition.

In one or more embodiments, the composition of the present invention may include at least 1% by weight, in other embodiments at least 2% by weight, and in other embodiments at least 3% by weight tackifier resin, based upon the entire weight of the composition. In these or other embodiments, the composition may include less than 60% by weight, in other embodiments less than 40% by weight, and in other embodiments less than 20% by weight tackifier resin, based upon the entire weight of the composition. In one or more embodiments, the compositions of this invention include from about 1 percent by weight to about 60 percent by weight, in other embodiments from about 2 percent by weight to about 40 percent by weight, and in other embodiments from about 3 percent by weight to about 20 percent by weight tackifier resin, based upon the entire weight of the composition.

In one or more embodiments, the composition may include at least 0.6% by weight, in other embodiments at least 1.2% by weight, and in other embodiments at least 2% by weight polyurethane, based upon the entire weight of the composition. In these or other embodiments, the composition may include less than 40% by weight, in other embodiments less than 33% by weight, and in other embodiments less than 26% by weight polyurethane, based on the entire weight of the composition. In one or more embodiments, the compositions of this invention include from about 1.6 percent by weight to about 40 percent by weight, in other embodiments from about 1.2 percent by weight to about 33 percent by weight, and in other embodiments from about 2 percent by weight to about 26 percent by weight polyurethane, based upon the entire weight of the composition.

In one or more embodiments, the polyurethane domains may be characterized, at standard pressure and temperature, by a mean particle diameter of from about 0.1 µm to about 10 µm, in other embodiments from about 0.2 µm to about 8 µm, and in other embodiments from about 0.5 µm to about 5 µm.

In one or more embodiments, these discrete domains or olefinic polymer domains exist within the composition up to a temperature of about 37° C., in other embodiments up to about 55° C., in other embodiments up to about 80° C., in other embodiments up to about 100° C., and in other embodiments up to about 120° C. In one or more embodiments, the polyurethane domains and/or olefinic polymer domains may be co-continuous with the butyl rubber phase above these temperatures.

In one or more embodiments, the compositions may be characterized by being able to provide a peel strength (ASTM D 413; aged 24 hours at room temperature and tested at room temperature) of at least 3.0 pounds per lineal inch (pli), in other embodiments at least 4.0 pli, and in other embodiments at least 4.5 pli.

In one or more embodiments, the compositions may be characterized by being able to provide a peel strength (ASTM D 413; aged 24 hours at 158° F. and tested at 158° F.) of at least 1.0 pli, in other embodiments at least 1.5 pli, and in other embodiments at least 2.0 pli.

In one or more embodiments, the compositions may be characterized by a tensile strength (ASTM D 412) of at least 40 psi, in other embodiments at least 50 psi, and in other embodiments at least 55 psi.

In one or more embodiments, the compositions may be characterized by a maximum elongation (ASTM D 412) of at least 300 percent, in other embodiments at least 400 percent, in other embodiments at least 450 percent, in other embodiments at least 500 percent, in other embodiments at least 600 percent, and in other embodiments at least 700 percent.

In one or more embodiments, the compositions pass a dead load shear test. The dead load shear test includes measuring the separation of a test sample, and where the separation is less than 1/8" (<3.17 mm), the sample is deemed to have passed the test. The overall test sample is prepared by adhering two EPDM strips together with a 1"×1" adhesive seam sample, and the test includes placing the sample under the tension of a 300 g weight for 24 hours at 70° C. The slip or movement is measured as the distance that the two EPDM strips separate.

employed are provided in Table I in amounts reported in weight percent based upon the entire weight of all ingredients fed to the extruder. Table I also provides the location at which the ingredients were added to the extruder. Those ingredients added at the feed throat were added as solids using a first feeder that introduced the bromobutyl rubber and the propylene copolymer, and a second feeder was employed to introduce the remaining solids ingredients into the feed throat. Those ingredients added downstream were added by way of a pump, either as liquids or as a dispersion within an oil carrier.

The first barrel, which served as the feed section, was set to 27° C., the second barrel was set to 110° C., the third barrel was set to 104° C., the fourth barrel was set to 93° C., and the remaining barrels including the die were set to 82° C. The screw elements within barrels one through four were configured to generally achieve severe mixing and masticating; the screws within barrels five through seven were configured to generally achieve mixing and conveying; and the screws within barrels eight and nine, as well as the die, were generally configured for conveying.

TABLE I

|  |  | Sample | | | |
| --- | --- | --- | --- | --- | --- |
|  | Point Introduced | 1 wt % | 2 wt % | 3 wt % | 4 wt % |
| Ingredients |  |  |  |  |  |
| Bromobutyl Rubber | Feed Throat | 40 | 42 | 42 | 42 |
| Propylene Copolymer | Feed Throat | 7.0 | 4.0 | 4.0 | 4.0 |
| Titanium Dioxide | Feed Throat | 6.0 | 6.0 | 6.0 | 6.0 |
| Antioxidant I | Feed Throat | 0.25 | 0.25 | 0.25 | 0.25 |
| Antioxidant II | Feed Throat | 0.50 | — | — | — |
| Phenolic Resin | Feed Throat | 3.0 | 6.0 | 6.0 | 6.0 |
| Calcium Oxide | Feed Throat | 1.0 | 1.0 | 1.0 | 1.0 |
| Tackifier Resin I | Feed Throat | 8.0 | 4.0 | 4.0 | 4.0 |
| Tackifier Resin II | Feed Throat | 2.75 | 2.75 | 2.75 | 2.75 |
| Polybutene Oil | Barrels 3 & 7 | 27.69 | 26 | 26.4 | 27.19 |
| Diisocyanate | Barrel 5 | 1.5 | 3.0 | 3.0 | 3.0 |
| Aromatic Oil | Barrel 5 | 1.5 | 3.0 | 3.0 | 3.0 |
| Amine Catalyst | Barrel 3 | 0.81 | 2.0 | 1.6 | 0.81 |
| Total |  | 100.00 | 100.00 | 100.00 | 100.00 |
| Properties |  |  |  |  |  |
| Dead Weight Shear (70° C., mm) |  | 3.1 | 1.8 | 2.5 | 2.2 |
| Failure Type of DWS |  | — | — | — | — |
| Peel Adhesion (70° C., pli) |  | 5.43 | 7.02 | 4.84 | 4.21 |
| Failure type of Peel |  | Bridge | Bridge | Bridge | Bridge |

The compositions of this invention may be used as a seam tape for roofing membranes. In particular embodiments, the roofing membranes include polymeric membranes, such as thermoset (e.g. EPDM) or thermoplastic (e.g. PVD or TPO) membranes, which are often used on flat or low-sloped roofs.

In order to demonstrate the practice of the present invention, the following examples have been prepared and tested. The examples should not, however, be viewed as limiting the scope of the invention. The claims will serve to define the invention.

EXAMPLES

Samples 1-4

Four adhesive compositions were prepared according to aspects of the present invention. The compositions were prepared within a twin-screw extruder having an L/D of about 50, nine barrels, and a die. The ingredients that were The bromobutyl rubber was obtained under the tradename Bromobutyl X2 (Lanxess); the propylene copolymer was obtained under the tradename Vistamaxx 6102 (ExxonMobil); the titanium dioxide was obtained under the tradename R-105 (DuPont); antioxidant I was obtained under the tradename Anox 20 (Great Lakes); antioxidant II was obtained under the tradename Tinuvin PUR 866 (Ciba); the phenolic resin was obtained under the name SP-1068 (Schenectady); tackifier resin I was obtained under the tradename FT-11-44 (Neville) and was characterized by a softening point of 105° C.; tackifier resin II was obtained under the tradename FT-11-46 (Neville) and was characterized by a softening point of 130° C.; the polybutene oil was obtained under the tradename H-300 (Indopol); the diisocycante was obtained under the tradename Rubinate 9433 (Huntsman); the aromatic oil was obtained under the tradename HB-40 (Solutia); and the amine catalyst was obtained under the tradename Dabo Crystalline (Dabco), and was blended with Indopol H-25 and nonylphenol at 3.3 percent amine.

Upon extrusion from the die, the adhesive composition, which was white in color, was extruded onto a release paper. The compositions were tested for dead weight shear strength and peel adhesion. The results of this analysis are provided in Table I. The dead weight shear analysis was conducted at 70° C. within an air circulating oven employing a 300 g weight. More specifically, a 1"×1" adhesive sample was employed to adhere two 1"×4" EPDM samples that were primed with a primer obtained under the tradename Single-Ply QP (Firestone). The sample was prepared so that the 300 g weight could be suspended from one piece of EPDM while the second piece of EPDM was suspended from the top of the oven, thereby applying a shear force to the adhesive. After 30 minute exposure to the oven and the shear force, the distance that the two EPDM strips moved under shear was recorded. Where failure occurred, the failure type was recorded as either adhesive failure, which suggests that the adhesive pulled away from the EPDM sample, or cohesive failure, which suggests that the adhesive internally failed without necessarily pulling away from the EPDM. Where the failure appeared to be both adhesive and cohesive, the term "bridge" was used. Peel adhesion was conducted after aging the adhesive sample for one day at 70° C. and then conducting the test at 70° C. The analysis was conducted in accordance with ASTM D-413. In preparing the samples for the peel adhesion test, the samples were primed using a primer obtained under the tradename Single-Ply QP (Firestone). For purposes of the analysis, those samples that experienced less than 3.2 mm of movement under the dead weight shear analysis were deemed to have passed, and those samples demonstrating peel adhesion values in excess of 2.0 pounds per linear inch were deemed to have passed.

Samples 5-8

Four additional adhesive compositions were prepared according to aspects of the present invention within a planetary extruder. The planetary extruder was equipped with four modules having a length of about 400 mm and a diameter of 70 mm, and a single-screw extruder in communication between the feed throat and the first module. Dispersion rings were situated between each module. The ingredients that were employed were similar to those employed in samples 1-4 and are reported in Table II in weight percent based upon the entire weight of all ingredients fed to the extruder. Table II also provides the location at which the ingredients were added to the extruder. The ingredients added at the feed throat were added as solids using a first feeder that introduced the bromobutyl rubber and the propylene copolymer, and a second feeder was used to introduce the remaining solids ingredients to the feed throat. Those ingredients added downstream were added by way of pumps. Pump 1 was positioned between the feed section and module 1; pump 2 was positioned between the feed section and module 1; pump 3 was positioned between module 1 and module 2; and pump 4 was positioned between module 2 and module 3. The single-screw extruder had a length of 3 L/D and was set at room temperature; module 1 was set at 150° C.; module 2 was set at 115° C.; module 3 was set at 100° C.; and module 4 was set at 100° C.

TABLE II

| | | Sample | | | |
|---|---|---|---|---|---|
| | Point Introduced | 5 wt % | 6 wt % | 7 wt % | 8 wt % |
| Ingredients | | | | | |
| Bromobutyl Rubber | Feed Throat | 39.34 | 38.68 | 39.34 | 39.34 |
| Propylene Copolymer | Feed Throat | 6.88 | 6.77 | 6.88 | 6.88 |
| Titanium Dioxide | Feed Throat | 6.0 | 6.0 | 6.0 | 6.0 |
| Antioxidant I | Feed Throat | 0.25 | 0.25 | 0.25 | 0.25 |
| Phenolic Resin | Feed Throat | 2.95 | 2.9 | 2.95 | 2.95 |
| Calcium Oxide | Feed Throat | 1.0 | 1.0 | 1.0 | 1.0 |
| Tackifier Resin I | Feed Throat | 7.87 | 7.74 | 7.87 | 7.87 |
| Tackifier Resin II | Feed Throat | 2.7 | 2.66 | 2.7 | 2.7 |
| Polybutene Oil | Pumps #1&3 | 27.57 | 28.57 | 28.57 | 28.26 |
| Diisocyanate | Pump #4 | 1.5 | 1.5 | 1.0 | 0.75 |
| Aromatic Oil | Pump #4 | 1.5 | 1.5 | 1.0 | 0.75 |
| Amine Catalyst | Pump #2 | 2.43 | 2.43 | 2.43 | 3.24 |
| Properties | | | | | |
| Dead Weight Shear (70° C., mm) | | 2.2 | 3.0 | 3.0 | 0.4 |
| Failure Type of DWS | | Adhesive | Adhesive | Adhesive | Adhesive |
| Peel Adhesion (70° C., pli) | | 2.75 | 2.59 | 3.73 | 2.49 |
| Failure type of Peel | | Cohesive | Cohesive | Cohesive | Cohesive |

Comparative Samples 1-4

Four comparative adhesive compositions were prepared within a planetary extruder in a manner similar to samples 5-8. The ingredients employed are provided in Table III in amounts reported in weight percent based upon the entire weight of all ingredients fed to the extruder. Table III also provides the location at which the ingredients were added to the extruder. Notably, the ingredients did not include the propylene copolymer or tackifier resin I.

TABLE III

|  |  | Comparative Samples | | | | |
|---|---|---|---|---|---|---|
|  |  | C1 wt % | C2 wt % | C3 wt % | C4 wt % | C5 Wt % |
| Ingredients |  |  |  |  |  |  |
| Bromobutyl Rubber | Feed Throat | 45.6 | 45.6 | 45.6 | 45.6 | 45.6 |
| Titanium Dioxide | Feed Throat | 5.5 | 5.5 | 5.5 | 5.5 | 5.5 |
| Antioxidant I | Feed Throat | 0.25 | 0.25 | 0.25 | 0.25 | 0.25 |
| Phenolic Resin | Feed Throat | 9.78 | 9.75 | 9.75 | 9.75 | 9.75 |
| Calcium Oxide | Feed Throat | 1.0 | 1.0 | 1.0 | 1.0 | 1.0 |
| Tackifier Resin II | Feed Throat | 2.75 | 2.75 | 2.75 | 2.75 | 2.75 |
| Polybutene | Pump #1&2 | 21.9 | 21.9 | 21.9 | 21.9 | 21.9 |
| Diisocyanate | Pump #3 | 5.0 | 4.0 | 3.0 | 2.0 | 1.0 |
| Aromatic Oil | Pump #3 | 5.0 | 4.0 | 3.0 | 2.0 | 1.0 |
| Amine Catalyst | Pump #4 | 3.25 | 3.25 | 3.25 | 3.25 | 3.25 |
| Total |  | 100 | 98 | 96 | 94 | 92 |
| Properties |  |  |  |  |  |  |
| Dead Weight Shear (70° C., mm) |  | ∞ | ∞ | ∞ | ∞ | ∞ |
| Failure Type of DWS |  | Adhesive | Adhesive | Adhesive | Adhesive | Adhesive |
| Peel Adhesion (70° C., pli) |  | 0.64 | 0.59 | 0.80 | 0.72 | 0.76 |
| Failure type of Peel |  | Adhesive | Adhesive | Adhesive | Adhesive | Adhesive |

Various modifications and alterations that do not depart from the scope and spirit of this invention will become apparent to those skilled in the art. This invention is not to be duly limited to the illustrative embodiments set forth herein.

What is claimed is:

1. A pressure-sensitive adhesive polymeric composition comprising:
   (a) a butyl rubber;
   (b) a polyurethane;
   (c) an olefinic polymer component; and
   (d) a filler that includes titanium dioxide, wherein said adhesive polymeric composition is pressure-sensitive and where pressure-sensitive adhesive polymeric composition is a solids composition wherein said butyl rubber forms a matrix and where said polyurethane and olefinic component are discretely dispersed within said butyl rubber at a temperature of up to about 37° C.

2. The composition of claim 1, where said composition further comprises an oil.

3. The composition of claim 1, where the butyl rubber is a halogenated butyl rubber.

4. The composition of claim 1, where the composition further comprises a tackifier resin.

5. The composition of claim 1, where the composition includes from about 20 to about 60 percent by weight butyl rubber, from about 1 to about 50 percent by weight olefinic polymer component, from about 1 to about 12 percent by weight filler, from about 0.6 to about 40 percent by weight polyurethane, and from about 1 to about 70 percent by weight tackifier resin, based upon the total weight of the composition.

6. The composition of claim 1, where said filler includes at least 75 percent titanium dioxide.

7. The composition of claim 1, where said polyurethane is the reaction product of an isocyanate and phenolic resin.

8. The composition of claim 1, where said polyurethane is formed in the presence of the butyl rubber and olefinic polymer.

9. The composition of claim 1, where said olefinic component includes a copolymer of propylene and an olefin.

10. The composition of claim 9, where the solids composition is in the form of an extrudate.

11. The composition of claim 10, where the extrudate is deposited on a release paper or film.

12. The composition of claim 11, where the extrudate is substantially devoid of a solvent.

13. The composition of claim 1, where said composition has a whiteness of at least an L value of 85.

14. The composition of claim 1, where said olefinic polymer component includes at least 80 weight by percent of propylene.

* * * * *